United States Patent Office 3,732,333
Patented May 8, 1973

---

3,732,333
FORMALDEHYDE BLOCK COPOLYMERS AND PROCESSES
Gerald J. Mantell, Kansas City, Mo., and Wayne E. Smith, Shawnee, Francis R. Galiano, Prairie Village, and David Rankin, Kansas City, Kans., assignors to Gulf Oil Corporation, Pittsburgh, Pa.
No Drawing. Filed Oct. 2, 1963, Ser. No. 313,192
Int. Cl. C08g 3/00
U.S. Cl. 260—874
6 Claims

ABSTRACT OF THE DISCLOSURE

This invention relates to novel block copolymers of formaldehyde and to processes for preparing such copolymers. More specifically the invention concerns block copolymers of formaldehyde containing the grouping A—B which includes both A—B type block copolymers and B—A—B type block copolymers.

---

The terms "A—B" and "B—A—B" type block copolymer mean copolymers wherein "A" polymers are joined to "B" polymers. In A—B type block copolymers the "A" polymer is joined at one of its terminal ends to a "B" polymer. In a B—A—B type block copolymer the "A" polymer is joined at both of its terminal ends to a "B" polymer.

By a convention adopted herein the "B" polymer is always a polyoxymethylene chain, comprising recurring units of the formula —CH$_2$—O— and the "A" polymer will always be a polymer, including copolymers, of certain monomers hereinafter defined.

We have now discovered novel block copolymers of the aforedescribed types in which the "A" unit is a polymer of a monomer which is capable of undergoing living polymerization in the presence of an anionic polymerization initiator to form a stable polymer having at least one anionic site and in which the "B" unit is a polyoxymethylene chain.

In addition we have also discovered advantageous processes for preparing such copolymers.

THE "A" POLYMER

The "A" unit of the above described novel copolymer is derived from a stable anionic polymer, including random copolymers, of a monomer which is capable of undergoing "living" polymerization in the presence of an anionic polymerization initiator.

The term "living" polymerization is a term of art which describes the phenomenon whereby under certain conditions certain monomers are capable of forming polymer chains of theoretically infinite length, i.e. they do not terminate spontaneously by monomer termination but will continue to grow as long as there is any monomer present in the polymerization mixture to form a polymer chain which is essentially stable even though it contains an active site at the growing end, and which, if more monomer is added, will resume its growth until the newly added monomer is consumed.

The phenomenon of "living" polymerization was first described by Szwarc (J. Am. Chem. Soc. 78, 2656 (1956)) and has been the object of considerable additional recent study and elucidation. See, e.g., Welch, J. Am. Chem. Soc. 81, 1345 (1959);
O'Driscoll, J. Poly. Sci. 35, 259 (1959);
Tanaka, Kogyo Kagaku Zassi 63, 888 (1960);
Worsford, Can. J. Chem. 38, 1891 (1960);
Morton, Rubber & Plastics Age 42, 397 (1961);
Cubbin, Proc. Roy. Soc. (London) 268A, No. 1332, 1333, p. 260 (1962);
Glusker, J. Poly. Sci. 49, 297 (1961);
Glusker, J. Poly. Sci. 49, 315 (1961);
Miller, J. Poly. Sci. 56, 203 (1962);
Korotkov, Poly. Sci. USSR, Vol. 1, No. 1, p. 10 (1960);
Butler, J. Poly. Sci. 48, 357 (1960).

Although "living" polymerization is well known, including the types of monomers and the general techniques involved, the following remarks are offered for the better description and understanding of our invention.

The living polymerization is initiated by contacting the monomer, suitably in a liquid medium, with an anionic polymerization initiator, such as a metalorganic compound, which yields a carbanion, viz., (1) 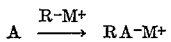
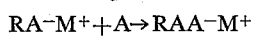

and chain-growth occurs by the mechanism (2)     RA$^-$M$^+$+A→RAA$^-$M$^+$
(3)     RAA$^-$M$^+$+A→RAAA$^-$M$^+$ until the supply of monomer is exhausted. In the above equations A represents the monomer, R and M respectively represent the organic and metal moieties of the polymerization initiator, R$^-$ being the carbanion and M$^+$ being the counterion. It will be noticed that as the chain grows the active anionic site is continually transferred to the end of the chain so that the living polymer itself becomes the carbanion which initiates further chain growth. In the case of the preparation of an "A" polymer suitable for use in preparing a B—A—B type block copolymer, a catalyst is employed which causes the "A" polymer to grow at both ends, each of which will be an anionic site, viz.,

We call these carbanionic polymers of this type "bi-carbanionic" polymers.

The particular anionic polymerization initiator which is employed will depend to some extent upon the particular "A" monomer being polymerized, but will generally correspond to those catalysts which are art-recognized as capable of initiating the living polymerization of the monomer. As specific examples of common anionic polymerization initiators which can be successfully employed in the practice of our invention may be mentioned alkali metals and compounds of alkali metals, aluminum and zinc such as butyl lithium, 9-fluorenyl lithium, amyl sodium, potassium naphthalenide, sodium metal, phenyl lithium, alkali metal hydrides, e.g., sodium hydride, aluminum alkyls and zinc alkyls, e.g., aluminum triethyl, aluminum triisopropyl, zinc dimethyl, zinc diethyl and zinc dibutyl. The radical anion type catalysts such as sodium naphthalenide are particularly suited for use in the preparation of a bi-carbanionic "A" polymer for use in preparing a B—A—B type block copolymer.

As will be appreciated by those skilled in the art the "A" polymer can be either a homopolymer or a copolymer so long as it is prepared under conditions conducive to the formation and maintenance of living polymers.

In general any of the reactive ethylenically unsaturated polymerizable monomers which can be polymerized by the use of an anionic initiator to form a stable carbanionic polymer without a chain termination step can be employed to form the "A" polymer in the practice of our invention. For example, we have successfully employed such diverse monomers of this type as styrene, α-methyl styrene, methyl methacrylate, n-butyl methacrylate, isoprene, acrylonitrile and N,N-di-n-butylacrylamide. The block copolymers of styrene and formaldehyde have especially advantageous properties such as clarity under proper molding conditions, improved flow properties and so forth.

The carbanionic "A" polymers are prepared in the practice of our invention by the methods generally known and employed in the art with the further qualification that the polymerization of the "A" monomer should be conducted under conditions which minimize chain transfer and chain termination so as to produce the largest number of "living" polymer chains. Preferably the polymerization is carried out in a liquid medium, which medium is capable of dissolving both the monomer and the polymer under very mild conditions of temperature e.g., $-70°$ C. to $+10°$ C., and at atmospheric pressure. Extreme care should be exercised to maintain the polymerization system essentially free of impurities which would cause chain transfer or chain termination. To this end it is desirable to employ high purity monomers, reaction medium liquids, catalysts, etc. Water, oxygen and commonly employed inhibitors are especially troublesome impurities which should be carefully excluded. In general any active hydrogen compounds should be excluded.

THE "B" POLYMER

The "B" polymer of the novel A—B block copolymers herein described is a polyoxymethylene chain comprising recurring units of the structural formula $(CH_2—O)$. These polyoxymethylene polymers are well known in the art. (See, e.g., Schweitzer et al., J. App. Poly. Sci. 1, No. 1, 158 (1959).) The "B" polymers are prepared by the polymerization of monomeric formaldehyde according to techniques well known in the art.

In general these techniques involve contacting high purity formaldehyde with an anionic polymerization initiator under anhydrous conditions in solution of an inert organic liquid medium such as a hydrocarbon or an ether. Again, as in the case of the preparation of the "A" polymer, it is necessary to carefully exclude any impurities which would cause chain termination or chain transfer in the "B" polymer chains, especially compounds having active hydrogen such as water, methanol, formic acid and methyl formate. Low polymerization temperatures also help to minimize chain termination and transfer.

Preparation of the block copolymer

The method we have discovered for preparing the novel block copolymers can be briefly described as the polymerization of the "A" unit monomer to form stable carbanionic polymer chains of the desired length and then using these carbanionic polymer chains to initiate the polymerization of formaldehyde, whereby the growing polyoxymethylene chain is attached to the "A" polymer at its formerly carbanionic end or ends, continuing the formaldehyde polymerization until the polyoxymethylene chains grow to the desired length, terminating the formaldehyde polymerization and recovering the copolymer. Desirably the polymerization of both the "A" and "B" monomers should be carried out under conditions which tend to minimize the formation of homopolymer "A" and homopolymer of "B." The stability of the resulting product is usually improved by "capping" the end of the "B" polymer to prevent depolymerization of the polyoxymethylene chain.

We turn now to the detailed description of the preparation of the novel A—B block copolymers:

The monomer used to prepare the "A" polymer is subjected to various purification procedures which will vary with the specific monomer involved but which are art-recognized as means of procuring highly pure monomers. These techniques include distillation, especially under inert gas blankets and in the presence of scavengers for various impurities, drying, for example by contacting with dessicants, recrystallization from very pure solvents, and contacting with adsorbents for the various impurities. If impurities are present in the "A" monomer during polymerization the number of "living" polymer chains will usually be correspondingly decreased leading to increased formation of "A" homopolymer rather than the desired block copolymer.

In the preferred practice of our invention the purified "A" monomer is introduced into a suitable reaction vessel such as a stirred, cooled flask containing as a polymerization medium a solvent which is normally liquid, which is inert under polymerization conditions, and which has been cooled to polymerization temperature. The solvent should be of high purity and should be selected for its ability to solubilize both the "A" monomer and the carbanionic "A" polymer. As examples of solvents which are suitably employed may be mentioned benzene, toluene, tetrahydrofuran, heptane and the like.

After the monomer is dissolved in the solvent the anionic catalyst is introduced into reaction mixture and the polymerization of the "A" monomer is carried out for a time sufficient to produce "A" polymer of the desired molecular weight, e.g., one-half to five hours will usually suffice.

After the polymerization of the "A" monomer is completed the "B" monomer, high purity formaldehyde, is introduced into the polymerization mixture containing the carbanionic "A" polymer chains, for example by bubbling gaseous formaldehyde into the solution of "A" polymer. The addition of formaldehyde monomer is continued until the polyoxymethylene chains have grown to the desired length and the formaldehyde polymerization can then be terminated, for example, by the addition of methanol or other active hydrogen compound to the polymerization mixture. It is preferred to provide a "post-polymerization" period after the addition of formaldehyde monomer is discontinued, during which period the formaldehyde in solution is polymerized, before the addition of polymerization terminator compound. The product is worked up by generally known techniques, for example, the polymerization mixture can be filtered to separate the suspended copolymer particles which are then selectively extracted with solvents for the "A" homopolymer and then dried in vacuo.

Since the "B" portion of the A–B copolymer is a polyoxymethylene chain which will undergo thermal depolymerization it is usually advantageous to "cap" the terminal end of the polyoxymethylene chain by replacing the terminal hydroxyl group thereof with an end-capping group according to art-recognized techniques. For example, the hydroxyl groups on the terminal ends of the polyoxymethylene chains can be replaced with acetate groups by reacting the copolymer in xylene suspension with acetic anhydride in the presence of a potassium acetate or sodium acetate catalyst. The "capped" copolymers have enhanced thermal stability.

We turn now to several specific examples of the invention and the preferred practice thereof. These examples are intended only as illustrations of the invention and not as indications of the limits of the scope thereof.

EXAMPLE 1

Preparation of high-purity formaldehyde monomer

High purity paraformaldehyde (99.14 wt. percent) is introduced into a 3-neck "generator" flask which is previously heated to the decomposition temperature of the paraformaldehyde (e.g. 100 to 150° C., preferably 120–130° C.). A stream of inert carrier gas, e.g. argon or helium, is passed into the flask and sweeps the impure formaldehyde gas from the generator into the bottom of a jacketed purification column which has a ratio of length to internal diameter of 6.6 and is packed with 0.24" x 0.24" protruded nickel packing (commonly called "Penn State Packing"). The column is cooled by circulating a coolant such as cold acetone or methanol through the jacket and contains a heater extending into the packing for use in regenerating the column. The impurities in the paraformaldehyde are "trapped" out of the formaldehyde by condensation on the cold column packing. The column cooling rate is controlled to produce a gas stream exit, the column having a temperature of −40° to −80° C. Periodically the flow of paraformaldehyde decomposition products to the column is stopped and the column is regenerated by turning on the heater and flushing the column with argon or helium. By this technique one recovers from about 70 to about 90 wt. percent of the formaldehyde content of the paraformaldehyde, in a product stream analyzing 99.8–99.9 wt. percent formaldehyde (argon-free basis), a major impurity being methyl formate which is the least objectionable of the several impurities found in the paraformaldehyde.

EXAMPLE 2

The procedure of Example 1 is repeated except that α-polyoxymethylene is decomposed in the generator instead of paraformaldehyde and except that the generator temperature is 150–200° C., preferably about 175° C. Substantially similar results are obtained.

EXAMPLE 3

Preparation of styrene-formaldehyde A—B type block copolymer

Styrene monomer is purified by contacting with calcined alumina and distilling in vacuo under an argon bleed. 15 ml. of the purified monomer is dissolved in 25–50 cc. of high purity benzene. 0.67 millimole of n-butyl lithium is then added slowly, the color change of the monomer solution giving a qualitative indication of the purity of the styrene solution. With highly pure monomer and solvent, less than 0.1 millimole of n-butyl lithium turns the solution light yellow and initiates polymerization. Further addition of catalyst turns the solution to darker shades of yellow and finally to orange. Once the orange color appears the styrene monomer is allowed to polymerize for one hour at room temperature.

High purity formaldehyde is prepared according to the procedure of Example 2 by decomposing 150 g. of α-polyoxymethylene at 140° C. and using a column exit gas temperature of −40° C. with an argon rate of 645 cc. min. After the completion of the 1 hour styrene polymerization period this formaldehyde gas is bubbled into the styrene polymerization mixture whereupon the orange color fades to white in about thirty seconds. The polymerization mixture is diluted to 1 liter with pure benzene and formaldehyde addition is continued over a period of four hours while maintaining the polymerization mixture at room temperature. After discontinuing the addition of formaldehyde a post-polymerization period of 30 minutes is allowed to polymerize the dissolved formaldehyde, then the polymerization is terminated by adding 100–500 cc. methanol to the polymerization mixture. The benzene solution of styrene homopolymer containing suspended styrene-formaldehyde A—B copolymer is then filtered to separate the crude copolymer. This crude copolymer is then selectively extracted by repeated washing with toluene in a Waring Blender to remove the styrene homopolymer and, finally the extracted copolymer is washed with methanol to remove the toluene and then dried in vacuo at 60° C. for 12 hours.

The A—B copolymer product weighs 43.3 grams, is snow white in color, analyzes 48.45 wt. percent carbon, has an inherent viscosity measured in DMF at 150° C. of 0.49 dl./g. and has a Barcol hardness of 72.

Twenty grams of the copolymer product is end-capped by acetylation with 80 ml. acetic anhydride in 600 ml. dimethyl formamide solvent in the presence of 64 g. dimethylaniline catalyst at 140° C. for one hour.

The thermal stability of the acetylated copolymer ($k_{222}$) is 0.14%/minute. It has an inherent viscosity of 0.79, is not flexible and contains 16.0 wt. percent copolymerized styrene.

EXAMPLE 4

The procedure of Example 3 is repeated with the following changes:

Polymerization medium—xylene
Amount of BuLi catalyst—0.54 millimoles
Amount of styrene monomer—5.0 ml.
"A" monomer polymerization time—1.75 hours
"B" monomer polymerization time—3.75 hours
"B" monomer polymerization temp.—5–10° C.

The unacetylated copolymer weighed 29.9 g., was white, analyzed 42.11 wt. percent carbon, had an inherent viscosity of 1.92 and a Barcol hardness of 74. The total copolymer product is acetylated as in Example 3 except that 0.1 g. of sodium acetate catalyst is used and the acetylation time is 3.5 hours. The acetylated polymer has a $k_{222}$ of 0.21%/minute, was white, contained 3.9 wt. percent copolymerized styrene, is flexible and has an inherent viscosity of 1.92.

EXAMPLE 5

Methyl methacrylate-formaldehyde A—B block copolymer

The carbanionic "A" polymer is prepared by the method of Glusker (supra). The reactor is charged with 80 ml. toluene and cooled to −60° C. 22 ml. of methyl methacrylate which has been purified by contacting with calcined alumina and distillation under an argon bleed is introduced into the reactor followed by 13 ml. of a 0.25 N solution of 9-florenyl lithium in ether. At this point the reaction mixture turns light green and becomes viscous. The solution is stirred for 80 minutes at −58 to −62° C. and a stream of purified formaldehyde gas prepared by the method of Example 1 is bubbled into the reactor whereupon the color fades to light yellow. Additional toluene is added to a volume of 900 ml. The formaldehyde feed is continued at −58 to −62° C. for 230 minutes. The white polymer product (28.4 g.) is separated by filtration, extracted first with toluene and then with acetone and dried in vacuo. The acetylated polymer contains 41.16% by weight of carbon, contains 5.8 wt. percent copolymerized methyl methacrylate, has an inherent viscosity of 0.93, a Barcol hardness of 79–80 and is flexible.

EXAMPLE 6 n-Butyl methacrylate-formaldehyde A—B block copolymer

The procedure of Example 5 is repeated except that one uses 20 milliliters of n-butyl methacrylate as the "A" monomer. The unacetylated block copolymer weighs 23.6 grams, is white and has a strong IR peak at 5.8μ. 20 g. of this copolymer is acetylated by slurrying it in xylene and reacting it with 120 ml. acetic anhydride in the presence of 0.9 g. potassium acetate at 80–120° C. for 3.5 hours. The acetylated polymer is recovered in 90.5 wt. percent yield, is white, has a $k_{222}$ of 0.20%/min., analyses 42.89 wt. percent carbon and 10.5 wt. percent combined n-butyl methacrylate, has a strong IR peak at 5.8μ, a Barcol hardness of 75–76 and is flexible.

EXAMPLE 7

Acrylonitrile-formaldehyde A—B block copolymer

The acrylonitrile carbanionic "A" polymer is prepared by the method of Miller (supra). Toluene is charged to the reactor, cooled to −78° C. and 0.96 millimole of butyl lithium is added. 6.5 ml. of acrylonitrile which has been dried over molecular sieves and distilled under argon is added to the reactor whereupon the contents become immediately viscous and turn light yellow. After stirring for 45 minutes, formaldehyde gas purified by the method of Example 2 is introduced causing the polymerization mixture to become very viscous. Three minutes later toluene is added to a volume of 800 ml. Formaldehyde addition is continued with agitation for 200 minutes at which time the mixture is filtered and the polymer is given one toluene wash with the careful exclusion of air. After further washing with toluene and methanol the polymer is dried in vacuo and characterized. The A—B copolymer yield is 34.0 g. containing 1.68 wt. percent nitrogen and 6.4 wt. percent copolymerized acrylonitrile.

EXAMPLE 8

Isoprene-formaldehyde A—B block copolymer

Purified tetrahydrofuran (25 ml.) and 15 ml. isoprene (purified by distilling from n-butyl lithium under argon distillate and used immediately) are placed in a 1 liter resin flask and cooled to 8° C. 0.5 ml. of a 25 wt. percent n-butyl lithium solution is added to the flask and a light yellow color develops. The viscosity of the reaction mixture increases during the next 15 minutes. Formaldehyde gas, purified according to Example 2 is introduced and the color disappears in about 30 seconds. Additional tetrahydrofuran (975 ml.) is added continually and the reaction temperature is maintained at 10° C. for two hours and then warmed to room temperature. One liter of n-hexane is added to the reaction mixture and the solid polymer is isolated by filtration and extracted overnight in a Soxhlet extractor with toluene to remove any isoprene homopolymer. This is followed by three methanol washes and the product is dried overnight in a vacuum oven at 50° C. The white A—B copolymer (34.2 g.) has 20.2 wt. percent copolymerized isoprene.

EXAMPLE 9

N,N-di-n-butylacrylamide-formaldehyde A—B block copolymer

The N,N-di-n-butylacrylamide "A" polymer is prepared by the Method of Butler (supra). 10 ml. of the monomer and 25 ml. of purified n-heptane is added to a 2-liter resin kettle. 0.3 millimole of n-butyl lithium is then added causing an immediate polymerization of the monomer. Several yellow-colored gel bodies which appear to dissolve with time are visible in the polymerization mixture. The "A" polymerization is allowed to proceed for 45 minutes and a stream of formaldehyde gas purified according to Example 1 and 475 ml. of additional heptane are added. Formaldehyde addition is continued for 3.5 hours. Methanol is added as an anti-solvent to improve the filterability of the copolymer. The product A—B copolymer is then separated from the polymerization mixture by filtration and is washed several times with methanol and dried in a vacuum oven. The purified A—B copolymer weighs 18.2 grams. The white acetylated copolymer contains 0.5 wt. percent nitrogen, 6.2 wt. percent copolymerized acrylamide, has an amide band at 6.1$\mu$ by infra-red scan, has a $k_{222}$ value of 0.20%/min., a Barcol hardness of 70 and is flexible.

EXAMPLE 10

α-Methyl styrene-formaldehyde B—A—B block copolymer

α-Methyl styrene is purified by distillation in vacuo over sodium hydride and is introduced by means of a syringe into a reactor containing 50 ml. tetrahydrofuran which has been similarly purified by distillation from sodium hydride under an argon blanket. The solution is cooled to —50° C. and sodium naphthalenide (10 ml.) is added which causes the solution to turn dark red. The solution is further cooled to —60° C. and stirred for 1 hour during which the viscosity increases. Next, high purity formaldehyde prepared as in Example 1 is introduced by bubbling into the red solution. The red color disappears in 60–90 seconds and the viscosity rapidly increases to the point of gelation, 900 ml. of benzene being added to the reaction mixture after the first five minutes and formaldehyde addition is continued for 145 minutes during which time the reaction temperature is maintained at about 8° C. The polymer formed is filtered from the reaction mixture and washed with methanol. The yield of B—A—B copolymer is 29.5 g. and is white.

A 5 g. sample of the B—A—B polymer is acetylated by contacting with 30 ml. acetic anhydride in 300 ml. xylene in the presence of 0.30 g. potassium acetate for 15 minutes at 80–120° C. The acetylated polymer has a $k_{222}$ of 0.082%/min., is white, has a carbon analysis of 43.74 wt. percent, contains 7.3 wt. percent copolymerized α-methyl styrene, an inherent viscosity of 1.65, has IR peaks at 13.2$\mu$ and 14.4$\mu$, a Barcol hardness of 77 and is flexible.

EXAMPLE 11

Styrene-formaldehyde B—A—B block copolymer

The reactor is dried by flushing with argon while heating by external flame. Freshly distilled tetrahydrofuran (60 ml.) is added to the reactor followed by 20 ml. of 0.1 N sodium naphthalenide solution. The solution is cooled to —60° C. and 10 ml. purified styrene is added whereupon a deep red color forms and the viscosity of the reaction mixture immediately increases. After 15 minutes purified formaldehyde gas prepared as in Example 1 is introduced causing the color to fade away in about 2 minutes. Formaldehyde addition is continued for two minutes, the reaction mixture is diluted to 1 liter total volume with purified toluene and formaldehyde addition is continued for 160 minutes at —60° C. The unacetylated B—A—B polymer, recovered by filtering the reaction mixture and washing with methanol, weighs 19.8 grams, is white, contains 44.26 wt. percent styrene and has an IR peak at 14.3$\mu$.

A 5.0 g. sample of the B—A—B copolymer is acetylated, yielding product with $k_{222}$ of 0.216%/minute, is white, contains 42.7 wt. percent carbon and 9.8 wt. percent copolymerized styrene, an inherent viscosity of 0.70, a Barcol hardness of 76–79 and is flexible.

EXAMPLE 12

A—B block copolymer where A polymer is a random copolymer of styrene and isoprene 100 ml. purified tetrahydrofuran is added to a predried argon-purged 2 liter resin flask. 20 ml. purified styrene and 10 ml purified isoprene are added to the flask along with 2.0 millimole of n-butyl lithium. The random copolymerization is allowed to proceed for 1 hour at room temperature during which the viscosity increases considerably. High purity formaldehyde prepared as in Example 1 is introduced into the reaction mixture along with 900 ml. additional tetrahydrofuran. Formaldehyde addition continues for 3 hours and the polymerization is terminated by the addition of 100 ml. methanol. The A—B block copolymer is filtered from the reaction mixture, washed with methanol and dried in vacuo to yield a white, moldable polymer composed of a random copolymer of styrene and isoprene block copolymerized with formaldehyde.

In the foregoing examples the inherent viscosity of the block copolymers is measured in dimethyl formamide at 150° C. The Barcol hardness values are obtained employing a standard Barcol Hardness Tester apparatus manufactured by the Barber-Coleman Co., Rockford, Illinois. The use of this apparatus is described in Lawrence, "Polyester Resins," p. 54 (Reinhold Pub. Co. 1960). The copolymers are classed as "flexible" if a 0.25 mm. thick specimen molded at 190° C. and 5000 p.s.i.g. does not break when bent at a 45° angle. The thermal stability values ($k_{222}$) of the copolymers are measured according to the method of Schweitzer et al. (J. App. Poly. Sci. vol. 1, No. 2, 158, 169 (1959)).

The block copolymers of our invention provide thermoplastic materials which, because of their creep properties, cold flow resistance, strength, stiffness, fatigue resistance, toughness, dimensional stability, abrasion resistance, frictional properties, electrical properties, chemical resistance and color, are highly useful in a wide variety of applications such as the manufacture of molded and extruded articles, films, fibers, coatings, etc., and, in general, are useful in most of the applications where polyacetal resins are employed.

A particularly important feature of our invention is that many of the properties, for example melt flow properties, of commercially available formaldehyde homopolymer resins can be advantageously altered by the inclusion of the "A" comonomer as a block unit *without* adversely affecting the hardness of the resulting polymer as is usually the case in the preparation of random copolymers of formaldehyde. Block copolymers of formaldehyde and butyl methacrylate remain flexible up to at least a 12 wt. percent methacrylate level. When molded at slightly below their softening point the styrene, methyl methacrylate and butyl methacrylate block copolymers yield water clear moldings. This is very surprising since moldings of formaldehyde homopolymers prepared under similar conditions are opaque white in color.

Having described our invention, we claim:

1. An A–B type block copolymer in which the A unit is derived from a stable carbanionic polymer of a reactive ethylenically unsaturated polymerizable monomer which can be polymerized by the use of an anionic polymerization initiator without a chain termination step, and in which the B unit is a polymer of monomeric formaldehyde prepared by contacting monomeric formaldehyde with said living A unit polymer.

2. Copolymer of claim 1 wherein the A unit monomer is styrene.

3. Copolymer of claim 1 wherein the A unit monomer is isoprene.

4. A block copolymer comprising the structure A–B in which the A unit is a polymer prepared by polymerizing a reactive ethylenically unsaturated polymerizable monomer under living polymerization conditions in the presence of an anionic polymerization catalyst to form a stable carbanionic polymer having at least one anionic site and in which the B unit is a polyoxymethylene chain prepared by contacting high-purity monomeric formaldehyde with the stable carbanionic A unit polymer, the said A unit polymer acting as a polymerization initiator for the formaldehyde monomer.

5. Copolymer of claim 4 which is a block copolymer of styrene and formaldehyde.

6. A process for preparing the block copolymer of claim 1, which process comprises in combination the steps of contacting a reactive ethylenically unsaturated polymerizable organic monomer which is capable of undergoing living polymerization with an anionic polymerization initiator under living polymerization conditions of temperature, pressure and monomer purity, whereby a stable carbanionic polymer of said monomer is obtained, contacting said stable polymer with formaldehyde monomer under essentially anhydrous conditions and under conditions of temperature and pressure suitable for formaldehyde homopolymerization, whereby the polymerization of formaldehyde monomer is initiated by said carbanionic polymer and whereby the polymer of formaldehyde thus initiated is united with said polymer at the anionic site thereof to form said block copolymer, and recovering said copolymer from the copolymerization mixture.

References Cited

UNITED STATES PATENTS 3,225,121  12/1965  Baker et al. _____ 260—874
3,350,359  10/1967  Yoshioka et al. _____ 260—874

JOHN C. BLEUTGE, Primary Examiner

U.S. Cl. X.R.

260—67 FP, 823, 887, 898, 901